(12) United States Patent
Sharma et al.

(10) Patent No.: US 10,599,656 B1
(45) Date of Patent: Mar. 24, 2020

(54) INDEXING AND DATA STORAGE FOR REALTIME AND CONTEMPORANEOUS CONTENT SUGGESTIONS

(71) Applicant: Twitter, Inc., San Francisco, CA (US)

(72) Inventors: Aneesh Sharma, San Francisco, CA (US); Jerry Jiang, Lafayette, CA (US)

(73) Assignee: Twitter, Inc., San Francisco, CA (US)

( * ) Notice: Subject to any disclaimer, the term of this patent is extended or adjusted under 35 U.S.C. 154(b) by 309 days.

(21) Appl. No.: 15/451,390

(22) Filed: Mar. 6, 2017

Related U.S. Application Data

(60) Provisional application No. 62/304,020, filed on Mar. 4, 2016.

(51) Int. Cl.
*G06F 17/30* (2006.01)
*G06F 16/2457* (2019.01)
*G06F 16/22* (2019.01)
*G06F 16/901* (2019.01)
*G06F 16/9535* (2019.01)

(52) U.S. Cl.
CPC ...... *G06F 16/2457* (2019.01); *G06F 16/2228* (2019.01); *G06F 16/9024* (2019.01); *G06F 16/9535* (2019.01)

(58) Field of Classification Search
CPC .................................................. G06F 16/9024
See application file for complete search history.

(56) References Cited

U.S. PATENT DOCUMENTS

| | | | |
|---|---|---|---|
| 5,729,303 A * | 3/1998 | Oku | H04N 5/4401 348/423.1 |
| 2012/0215785 A1 * | 8/2012 | Singh | G06F 16/9024 707/741 |
| 2014/0081767 A1 * | 3/2014 | Zhang | G06Q 30/02 705/14.66 |
| 2015/0032767 A1 * | 1/2015 | Gao | G06F 16/951 707/765 |

\* cited by examiner

*Primary Examiner* — Hung Q Pham
(74) *Attorney, Agent, or Firm* — Fish & Richardson P.C.

(57) ABSTRACT

The present invention relates generally to messaging platforms, and relates more particularly to data storage such that random sampling can be accomplished in real-time in messaging platforms. Aspects of the present invention include storing a bipartite graph with associations of two node types. The graph can be stored as a power law graph. The graph can be used to provide real-time content recommendations in a messaging platform. The content recommendations can be provided using random sampling of the node types stored in the graph.

20 Claims, 11 Drawing Sheets

INDEXING AND DATA STORAGE FOR REALTIME AND CONTEMPORANEOUS CONTENT SUGGESTIONS

CROSS-REFERENCE TO RELATED APPLICATION

This patent application claims priority to and commonly-owned U.S. Pat. App. No. 62/304,020 filed on Mar. 4, 2016, entitled "Systems and Methods for Realtime Content Suggestions," which patent document is incorporated by reference herein in its entirety and for all purposes.

BACKGROUND

The instant specification relates generally to indexing and data storage in the context of information retrieval and, more particularly, to improving data storage and retrieval such that random sampling of a directed graph, as well as other graph traversal techniques, can be implemented at scale on a real-time social platform.

As the value and use of information continues to increase, individuals and businesses seek additional ways to process, store, and communicate information. One option available to users is a messaging platform. A messaging platform is a platform for exchanging messages between users of the platform. The platform generally also maintains servers to process, compile, store, index, retrieve, and/or communicate information or data for business, personal, or other purposes thereby allowing users to take advantage of the value of the information. One kind of messaging platform is a social media platform, where content—which can be implemented, for example, in the form of text strings, emojis, images, video, audio, live streams, and any of their combinations—is distributed according to a directed graph in which there are nodes and edges. One example of a directed graph is a link graph where nodes represent Web pages and edges represent in and out links. Another example of a directed graph is a follow graph where nodes represent users and edges represent relationships between or among users (i.e., an edge pointing from node A to node B represents a relationship in which user A follows user B).

Messaging platforms typically index and store content and, in response to a user submitted query, retrieve content determined to be of interest to the user. In order to enhance user experience, however, a messaging platform can also recommend content or users to a user without a user making a request. For example, a messaging platform can recommend that a user connects with another user on the platform. The messaging platform can also recommend particular content to a user. To further enhance the user experience, the content or user recommendations can be specifically tailored to the particular user.

One example of when recommendations can be particularly useful to a user is when a user is new to a messaging platform and is not connected to many other users and has not interacted with a great deal of content. It can be particularly burdensome for new users to locate other users or content, particularly on a mobile application of a messaging platform.

SUMMARY

The present invention provides real-time recommendations even on large messaging platforms. The real-time recommendations can be provided based on random sampling of stored associations between two node types, for example, between users and content. A data structure, referred to as an adjacency list, is a mechanism to store edges between a single user and a plurality of content, or posting lists, and a mechanism to store edges between a single posting list and a plurality of users. The adjacency list can have the following properties: edges can grow, reader can have unrestricted access, concurrent readers (there are multiple readers, but typically only one writer), ability to drop edges, and an algorithm to randomly sample edges in real-time. The randomly sampled edges allow the real-time recommendations. Moreover, the ability to randomly sample edges allow for running and random-walk based graph traversal techniques for real-time recommendations that are fast and heavily personalized as they examine only a small portion of a directed graph.

In one implementation, a social media platform includes a constituent that is a data engine that organizes live interactions as a bipartite graph. (Interactions are any sort of engagements a user may take on the platform with its content; examples of interactions include reading a message, liking the message, following the author of the message, and reposting the message, with or without adding content or commentary.) The graph includes nodes that represent social messages, nodes that represent users, and edges that represent the interactions users have with messages or how messages are related to users. Edges connect directly only nodes of different types. So, edges do not connect directly two nodes that are both messages. Nor do they connect two nodes that are users. Furthermore, the graph is stored in temporally partitioned index segments that hold adjacency lists. The graph stores only a "sliding window" (in one case, the most recent 17 hours' worth of interactions) in temporarily partitioned index segments that store adjacency lists, occasionally removing the oldest segment from memory to make room for indexing new segments. The data engine is able to support rapid ingestion of edges while concurrently serving lookup queries through a combination of compact edge encoding and a dynamic memory allocation scheme that exploits power-law characteristics of the graph, as will be explained in detail below. The entire graph can be stored on one instance of a server (600 million edges consume about 30 MB of RAM), and each individual server is able to ingest up to one million graph edges per second, and in steady state, each server can compute up to 500 recommendation requests per second, which translates into several million edge read operations.

This capability is particularly helpful during a period contemporaneous with a real-time event that is breaking, for example, when a really cool Superbowl commercial is being broadcasted, when a blunder occurs during live broadcast of a television show (#2017Oscars), when a political protest foments, or at the start of an impending and dangerous storm. Engagements here can spike into the hundreds of millions over a period of seconds, and the ability to graph and index the engagements so that computing resources such as a recommendation engine can process the engagements contemporaneously with the event of interest enables the platform to push relevant content users in a timely manner.

Accordingly, embodiments overcome shortcomings of the prior art by providing a messaging platform recommendation systems and methods that can provide real-time recommendations to new users. In particular, embodiments actually compute recommendations at query time (rather than serving previously stored recommendations) and, furthermore, continuously update the underlying bipartite graph (rather than updating in batches).

Accordingly, embodiments overcome shortcomings of the prior art by providing a messaging platform recommendation systems and methods that can provide real-time recommendations to users during "live" events.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF EMBODIMENTS

Figure 1A:
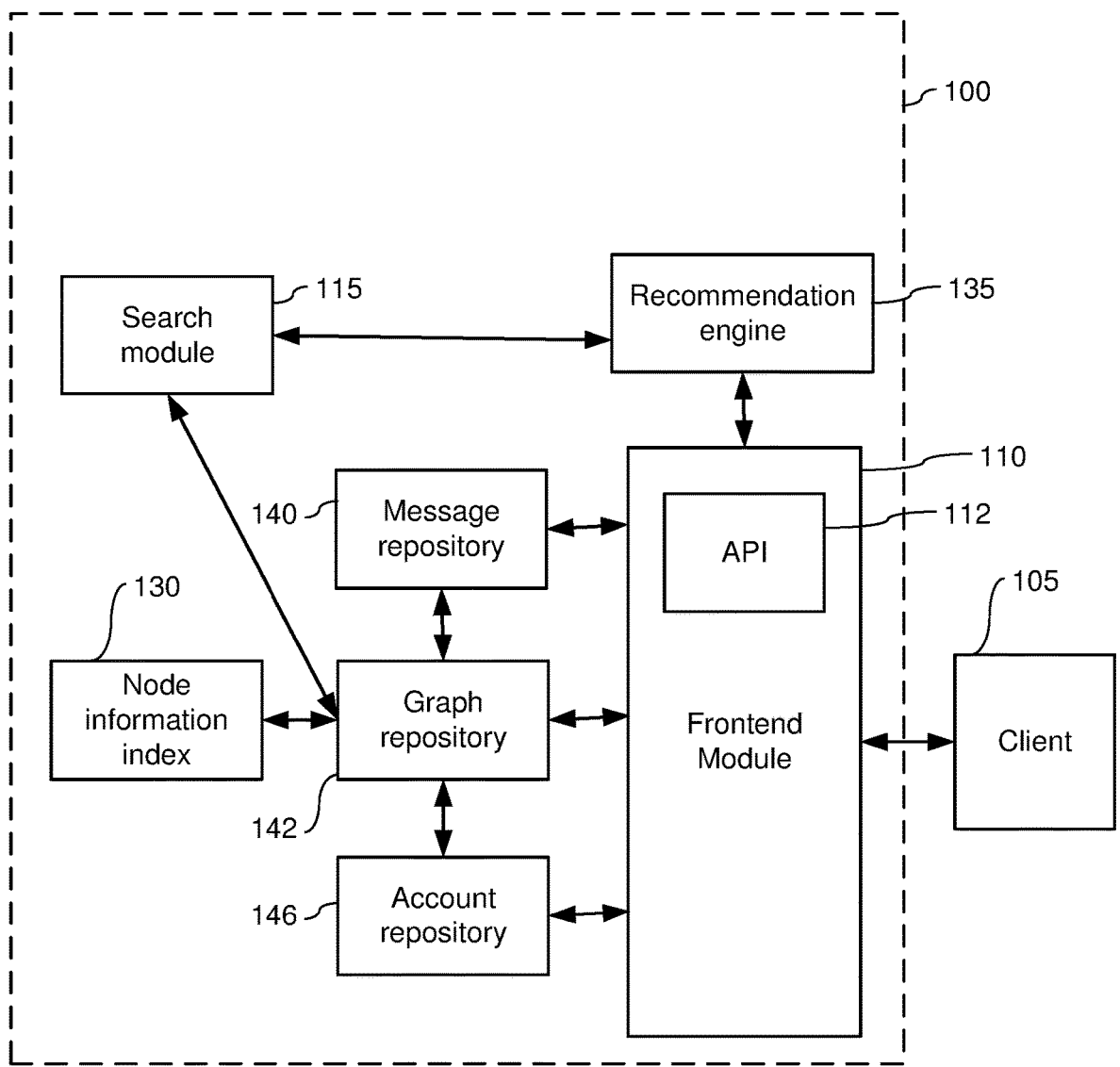
FIG. 1A depicts a block diagram of a messaging platform according to embodiments of the present invention.

FIG. 1A shows a messaging platform 100 and a client 105 according to embodiments of the present invention. As shown in FIG. 1A, messaging platform 100 has multiple components including a frontend module 110 with an application programming interface (API) 112, a search module 115, a message repository 140, a graph repository 142, an account repository 146, a node information index 130, and recommendation engine 135. Various components of the messaging platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In embodiments of the present invention, messaging platform 100 is a platform for facilitating real-time communication between one or more entities or users. For example, the messaging platform 100 can store millions of accounts of individuals, businesses, and/or other entities (e.g., pseudonym accounts, novelty accounts, etc.). One or more users of each account may use the messaging platform 100 to send messages or content to other accounts inside and/or outside of the messaging platform 100. The messaging platform facilitates sending content. Content can be a social media message or social media post. In one embodiment, the social media message or social media post can be a tweet. In one or more embodiments, the messaging platform 100 can be configured to enable users to communicate in "real-time", i.e., to converse with other users with a minimal delay and to conduct a conversation with one or more other users during simultaneous sessions. In other words, the messaging platform 100 can allow a user to broadcast messages and can display the messages to one or more other users within a reasonable time frame so as to facilitate a live conversation between the users. Recipients of a message may have a predefined graph relationship with an account of the user broadcasting the message. In some embodiments of the present invention, the user is not an account holder or is not logged in to an account of the messaging platform 100. In this case, the messaging platform 100 can be configured to allow the user to broadcast messages and/or to utilize other functionality of the messaging platform 100 by associating the user with a temporary account or identifier. In embodiments of the present invention, the user can interact with content only and not with other users. For example, a user can watch videos or read articles or books or interact with any other content that is on the messaging platform, but not necessarily put on the platform by another user.

One of ordinary skill in the art will appreciate that the messaging platform 100 can be any messaging platform. By way of example only, the messaging platform can be platforms for social media, communication, shopping, audio, video or other digital content streaming, gaming, or any other messaging platform. A messaging platform can also include video game platforms that can be accessed by personal computer (PC), tablet, iPhone, iPad, Apple computing device, wearable computer, gaming system, etc.

In embodiments of the present invention, search module 115 includes functionality to receive a search query identifying a user of messaging platform. The search query can be generated by the frontend module 110 in response to a search request received from the client 105 and then sent to the search module 115. Search module 115 can also identify a random sample of a content type for a user. Search module 115 can use the node information index 130 to complete the random sampling. Search module 115 can also provide the random sample in response to the query to the frontend module 110. In embodiments of the present invention, a user or a client device 105 can generate a request for a recommendation. In other embodiments, recommendation engine 135 can initiate a request in the search module 115. For example, recommendation engine 135 can provide content recommendations to users or non-users of messaging platform 100 even without a user specifically requesting content. The content can be provided on the messaging platform. For example, a user can be presented with new content recommendations in a timeline, home screen, a frame on the right or left hand side of the user screen, or in an email or text message. In some embodiments, the recommendation engine 135 can provide the recommendation responsive to a user action. For example, the user action can be interacting with content on the messaging platform 100, refreshing messaging platform 100, being new to messaging platform

100, specifically requesting content recommendations from messaging platform 100, or interacting with content outside of messaging platform 100. The search module 115 can initiate a search based on any user action, including but not limited to those on the above list of user actions.

Figure 1B:
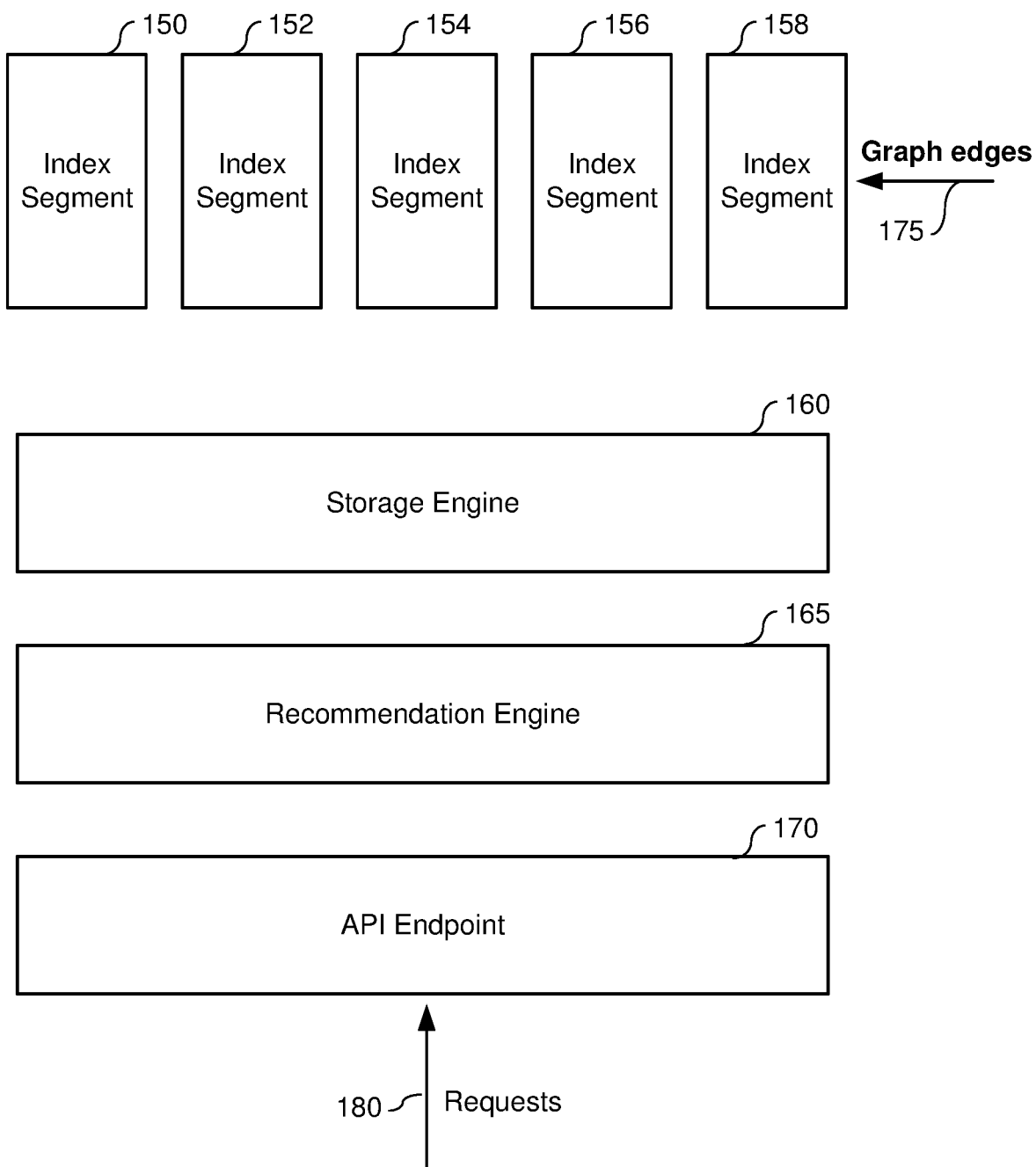
FIG. 1B depicts a block diagram of a graph-based content recommendation system according to embodiments of the present invention.

FIG. 1B depicts a block diagram of a graph-based content recommendation system according to embodiments of the present invention. FIG. 1B shows an overview of a graph-based recommendation system.

In an embodiment, the content recommendation system manages a dynamic, sparse, undirected bipartite graph G=(U, T, E), where a left-hand side U represents users, a right-hand side T represents content, and the edges E represent interactions over a temporal window. In an embodiment, vertices (on the U and T sides) are identified by 64-bit integers (unique to each side). In an embodiment, edges have a particular type r E R, but that the cardinality of IRI is relatively small and fixed. In an embodiment, these types correspond to actions such as likes, re-posts, etc. In an embodiment, edges are not timestamped.

In an embodiment, bipartite interaction graph, the cardinalities of vertices on the left and right hand sides grow as new edges are inserted. The number of users, however, increases more slowly than the number of content posts. In an embodiment, recommendation system maintains vertex metadata, but the memory requirements of holding these metadata are not particularly onerous. Most of the growth in the size of the graph, and corresponding memory requirements, occurs in the addition of new edges that correspond to users' interactions with content.

In an embodiment, the bipartite graph is undirected. In an embodiment, the edges are stored internally in adjacency lists. In an embodiment, a left-to-right index is used which for u∈U provides edges that are incident on u, with the destination vertices and edge type, i.e., (t, r) tuples where t∈T and r∈R. In an embodiment, a right-to-left index, which for t∈T provides the edges that are incident on t, with their destination vertices and edge type, i.e., (u, r) tuples where u∈U and r∈R. Depending on the desired data access pattern, a left-to-right index, a right-to-left index, or both can be used.

At the storage layer, graph-based recommendation system implements a very simple API, comprising of five main methods:

insertEdge (u, t, r): inserts an edge from user u to content t of type r into the bipartite graph.

getLeftVertexEdges (u): returns an iterator over the edges incident on u, a user on the left-hand side. More precisely, the iterator provides (t, r) tuples where t∈T, r∈R. In an embodiment, the edges can be returned in any order. In an embodiment, the iteration order is the order in which the edges are inserted into the graph getLeftVertexRandomEdges (u, k): returns k edges uniformly sampled with replacement from the edges incident to vertex u, a user on the left-hand side. Results are returned as an iterator over (t, r) tuples where t∈T, r∈R. In an embodiment, edges can be returned more than once, particularly in cases where the degree of the vertex is smaller than k.

getRightVertexEdges (t): returns an iterator over the edges incident on t, content on the right-hand side. More precisely, the iterator provides (u, r) tuples where u∈U, r∈R. In an embodiment, the method makes no guarantee with respect to the order in which the edges are returned. In an embodiment, the iteration order is the order in which the edges are inserted into the graph.

getRightVertexRandomEdges (t, k): returns k edges uniformly sampled with replacement from the edges incident to vertex t, content on the right-hand side. Results can be returned as an iterator over (u, r) tuples where u∈U, r∈R. In an embodiment, edges can be returned more than once, particularly in cases where the degree of the vertex is smaller than k.

In an embodiment, the storage engine 160 can guarantee that calls to the get methods will return an iterator that corresponds to a consistent state of the graph at call time, and that all sampling probabilities are accurate. In an embodiment, newly arrived edges will not be visible while the iterator is being traversed. In an embodiment, the storage engine, however, makes no guarantees with respect to the state of the graph across multiple get calls—multiple gets on the same vertex may indeed return different numbers of edges.

In an embodiment, the API 170 does not support edge deletions. Edges in a bipartite graph capture interactions, or engagements, between users and content—a user reposting a post, for example—and such interactions represent point events that have no duration. Furthermore, it is often not meaningful to talk about deleting such edges, most since such interactions cannot be undone. From the implementation perspective, not needing to support deletes greatly simplifies many aspects of the implementation.

In an embodiment, the API 170 does not support deletes, the graph can grow without bound. However, in an embodiment, a temporal window is used, for example n hours.

Although the data model of the graph-based content recommendation system can be an undirected bipartite graph, the system can be adapted to store standard directed or undirected graphs in a straightforward manner. In an embodiment, the vertices on the left-hand and right-hand side are set to be the same, and build a left-to-right index, a standard directed graph is modeled, where the getLeftVertexEdges method (and the sampling variant) retrieve outgoing edges with respect to a vertex. In an embodiment, a right-to-left index is used to retrieve incoming edges to a vertex using the getRightVertexEdges method (and the sampling variant).

FIG. 1B shows index segments 150, 152, 154, 156, and 158. FIG. 1B also shows storage engine 160, recommendation engine 165, and API endpoint 170. Storage engine 160 can maintain a list of temporally-ordered index segments comprised of adjacency lists that store a partition of the bipartite graph. In an embodiment, the storage engine provides raw access to the graph in support of the recommendation engine. The entire system represents an API endpoint 170 for external clients to request recommendations.

Requests 180 come into the API endpoint 170. The requests are processed by the recommendation engine 165 relying on storage engine 160. Graph edges 175 can be stored in index segments 150, 152, 154, 156, and 158 as described further below.

Since each index segment 150, 152, 154, 156, and 158 can hold a small set of vertices (relative to the 64-bit id space), in an embodiment, memory requirements can be reduced by building a (bi-directional) mapping between the external (i.e., canonical) vertex id and an internal vertex id that is unique only within the particular index segment. This reduction can be accomplished by hashing the external vertex id and treating the hash value as the internal vertex id. In an embodiment, a standard double hashing technique, an open-addressing scheme whereby the initial probe site in the hash table (i.e., array) is determined by one hash function, and the skip interval between linear probes in case of collisions is determined by a second hash function, is used. In an embodiment, the external vertex id is stored in the hash table, so that recovering those ids can be accomplished by a simple array lookup. In an embodiment, the hash table is sized to be a power of two so that mod can be accomplished via efficient bit operations.

Because, in an embodiment, the hash value is used as an internal vertex id, the entries cannot be rehashed (e.g., to grow the table). In an embodiment, the initial sizing of the hash table is planned using historical data as a guide. Suppose n vertices are stored at a load factor f: the initial hash table size is sized to be 2b where b=flg(n/f)l. The hash table is filled until f·2b vertices are inserted, after which another hash table of size 2b−1 is allocated to hold the next f·2b−1. For these new vertices, the interval vertex id is the hash value in the new table plus 2b, so the external vertex id is determined. The process can be repeated as often as necessary, but the index segment size and the initial table size can be tuned so that additional allocations are rare events.

In an embodiment, further optimization can be achieved by bit-packing both the edge type and internal vertex id in a single 32-bit integer. For example, three bits can be reserved to support eight edge types, which allows room for 229 (approximately 536 m) unique vertex ids. This optimization means that, within each index segment, an adjacency list can be an array of 32-bit integers. Inserting new edges into the graph simply becomes the process of looking up the adjacency list (array) belonging to the vertex and writing an integer into the next available location. Since, in an embodiment, there is only a single insertion thread, there are no consistency issues.

Figure 2:
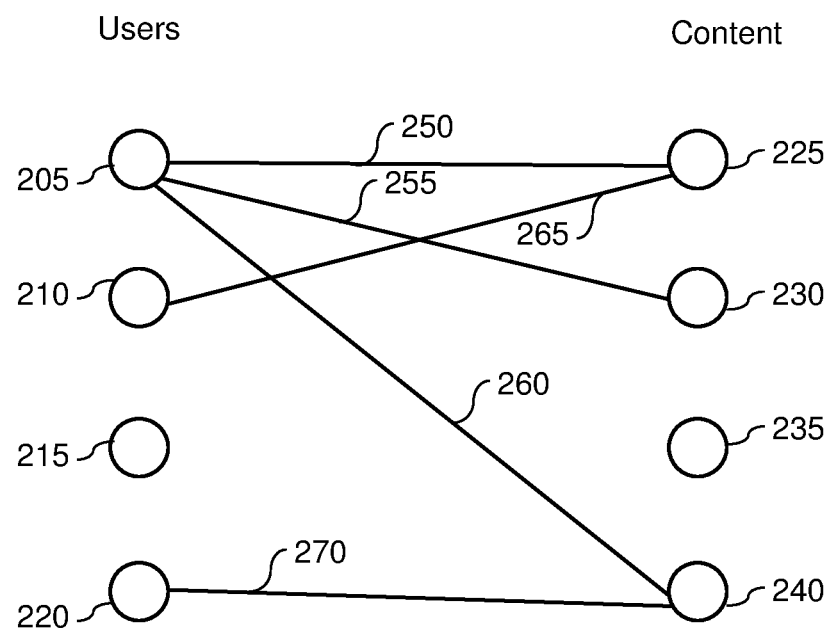
FIG. 2 depicts a block diagram of a bipartite graph according to embodiments of the present invention.

FIG. 2 depicts a block diagram 200 of a bipartite graph according to embodiments of the present invention. FIG. 2 depicts two nodes and their associations, or edges. In the embodiment shown in FIG. 2, the two nodes depicted are users and content. However, one of skill in the art will appreciate that the two nodes can be any two nodes and are not limited to users and content. In some embodiments, there can be millions or more hundreds of millions of users and billions or tens of billions of content nodes or more. Content includes a posting list and a posting list can be any content on the messaging platform, for example, content can be a user written message or user authored content, a link to other content on the internet such as an article, website, or book, a video, audio, or photo or a link to a video or photo. Content is not limited to the above examples, but can include any available content on a messaging platform.

For ease of explanation, FIG. 2 shows an example with four users, user 205, user 210, user 215, and user 220. However, the invention is not limited to a particular number of users or a particular number of content nodes. FIG. 2 also shows five content nodes, content 225, content 230, content 235, content 240, and content 245. The lines 250, 255, 260, 265, and 270 in FIG. 2 represent associations or edges linking users and content. For example, anytime a user interacts with content such as posting it, viewing it, purchasing it, indicating a preference for the content (such as a favorite or like), replying to the user regarding the content, or forwarding the content on the messaging platform, the user is linked by an edge to the content and the content is linked by an edge to the user. In an embodiments, the graph is stored as user to content. In an embodiment, the graph is stored as content to user. In an embodiment, the graph is stored as both content to user and user to content. In an embodiment, the graph is stored as user to query. In an embodiment, the graph is stored as user to entity. An entity can be any word or phrase that can be used for trends on messaging platforms.

In order to make a recommendation for one user, that user's behavior and other users' behavior can be taken into account. In an embodiment, a recommendation can be made based on running a Stochastic Approach for Link-Structure Analysis (SALSA) algorithm. The SALSA algorithm can begin with a random walk. In one embodiment, a recommendation can be made based on a random walk. A random walk is performed by selecting a random user and then following the edges to a random content and back to a random user. Each time a user or content is selected, it is considered a step of the walk. Any number of steps can be used, but a five step random walk is typically sufficient to get adequate information.

For example, performing a random walk from user 205, assign a value of 1.0 to user 205. Then divide 1.0 equally among the content with edges to user 205. To perform step two, select a content and divide the equally back to each user. That is step one of the walk. In one embodiment, each user weight can be multiplied by a reset or normalization value. This process can be continued for 5 more steps or any number of steps deemed adequate. The reset value can be determined by any number of factors. For example, some users are more heavy users than others and interact more with the messaging platform and with all content than other users, for example, celebrity users. Therefore, to normalize the weighting an appropriate reset value can be chosen.

This random walk can provide content that can be of interest to users or users that can be of interest to users based on that user's behavior and other users' behavior and relationships between users and content or edges.

In an embodiment, the query user may not exist in the bipartite interaction graph, which would be the case for users who haven't had a recent interaction. To address this, the random walk can be started from a seed set instead of a single user vertex. The seed set can be configurable, but a common choice is the circle of trust of the user. In an embodiment, the unmodified SALSA algorithm described above actually computes a distribution over vertices that is not user-specific (in the limit as k→∞, the choice of the starting vertex has no effect on the final distribution). In an embodiment a reset step on the left-to-right edge traversal in the random walk: with a fixed probability a, we restart from the query vertex (or a uniformly-sampled vertex from the seed set) to ensure that the random walk doesn't stray far from the starting vertices is included.

In an embodiment, the output of this SALSA algorithm is a ranked list of vertices on the right-hand side of the bipartite interaction graph. In an embodiment, the content may not have any direct interactions with the seed set at all. This feature is a strength of the algorithm for users with a sparse seed set, but it can lead to noise for users with a dense seed set. Furthermore, having direct public interactions (such as reposts and likes) enable the product to serve a social proof—explaining why a recommendation was produced. This typically results in better user understanding of the recommendations, leading to higher engagements. We describe how to address this limitation next.

In an embodiment, the recommendation system only serves recommendations for which are "social proof." This goal can be accomplished in the random walk algorithm by restricting the output set to only neighbors (on the right-hand side) of the seed set. The fanout of the seed set is usually not very large, and moreover the edges from seed set can be downsampled to bound the vertex degrees (to avoid creating overly-unbalanced graphs). This downsampling produces a subgraph of the complete bipartite interaction graph that can be used for the SALSA algorithm.

In addition to content recommendations queries, embodiments also support similarity queries that return all vertices (of the same type) similar to the query vertex. For concreteness, we focus on queries for right-hand vertices (content), but the symmetric process applies to left-hand vertices as well.

In an embodiment, given a query vertex t, embodiments can find other vertices that receive engagement from a similar set of users that t received engagements from. This can be formalized in terms of cosine similarity between two vertices $t_1$ and $t_2$:

$$\text{Sim}(t_1, t_2) = \frac{N(t_1) \cap N(t_2)}{\sqrt{|N(t_1)| * |N(t_2)|}}$$

where N (t) denotes the left-side neighbors of vertex t. Thus, for a query vertex t, embodiments can construct a ranked list of content with respect the similarity metric.

In an embodiment, an algorithm is based on random walks: given a vertex t, embodiments first sample its neighborhood N (t) to obtain a set NS (t). Then, for each vertex u∈NS (t) embodiments sample u's neighbors to produce a set of candidates that sample u's neighbors to produce a set of candidates that might be similar to t. Embodiments can set weights on each of the sampling steps such that the expected number of visits for each candidate ti is proportional to Sim(t, ti). By repeating this sampling process many times, embodiments can compute both the candidate vertices and an estimate of their similarities. The algorithm then returns these candidates sorted by similarity.

In embodiments of the present invention, the relationships between users and content or edges can be used to make personalized content recommendations for users that can be injected in a main screen on the messaging platform. In other embodiments, the edges can be used to make content recommendations for users that can be sent via email. In other embodiments, the edges can be used to make content recommendations for users that can be sent via push notifications. In other embodiments, the edges can be used to find related content to a given content. In other embodiments, the edges can be used to find content popular near a certain geographic location. In other embodiments, the edges can be used to make related search suggestions or personalized search suggestions for a given user. In other embodiments, the edges can be used to present personalized real-time trending topics for users. In other embodiments, the edges can be used to make personalized user follow suggestions shown on the messaging platform. In other embodiments, the edges can be used to make personalized user follow suggestions sent over email. In other embodiments, the edges can be used to make personalized user follow suggestions sent via push notifications.

In some embodiments of the present invention, one important consideration in performing the random walk is that the users, content and edges need to be maintained current and have the ability to be randomly sampled. This currency is particularly important for providing recommendations during "live" events. For example, if the messaging platform is providing content recommendations related to a touchdown that happened during the Superbowl, the users, content and edges need to be updated in real-time in order for the messaging platform to perform the random walk.

In some embodiments, it is possible that there are 25,000 or more clicks per second on a messaging platform and therefore 25,000 or more edges per second that need to be updated in order to perform the random walk. Therefore, a query related to content would need to receive a response back very quickly, possibly in 200 ms or less. In order to perform such fast updating and computation a novel data structure is implemented in some embodiments of the present invention.

Figure 3A:
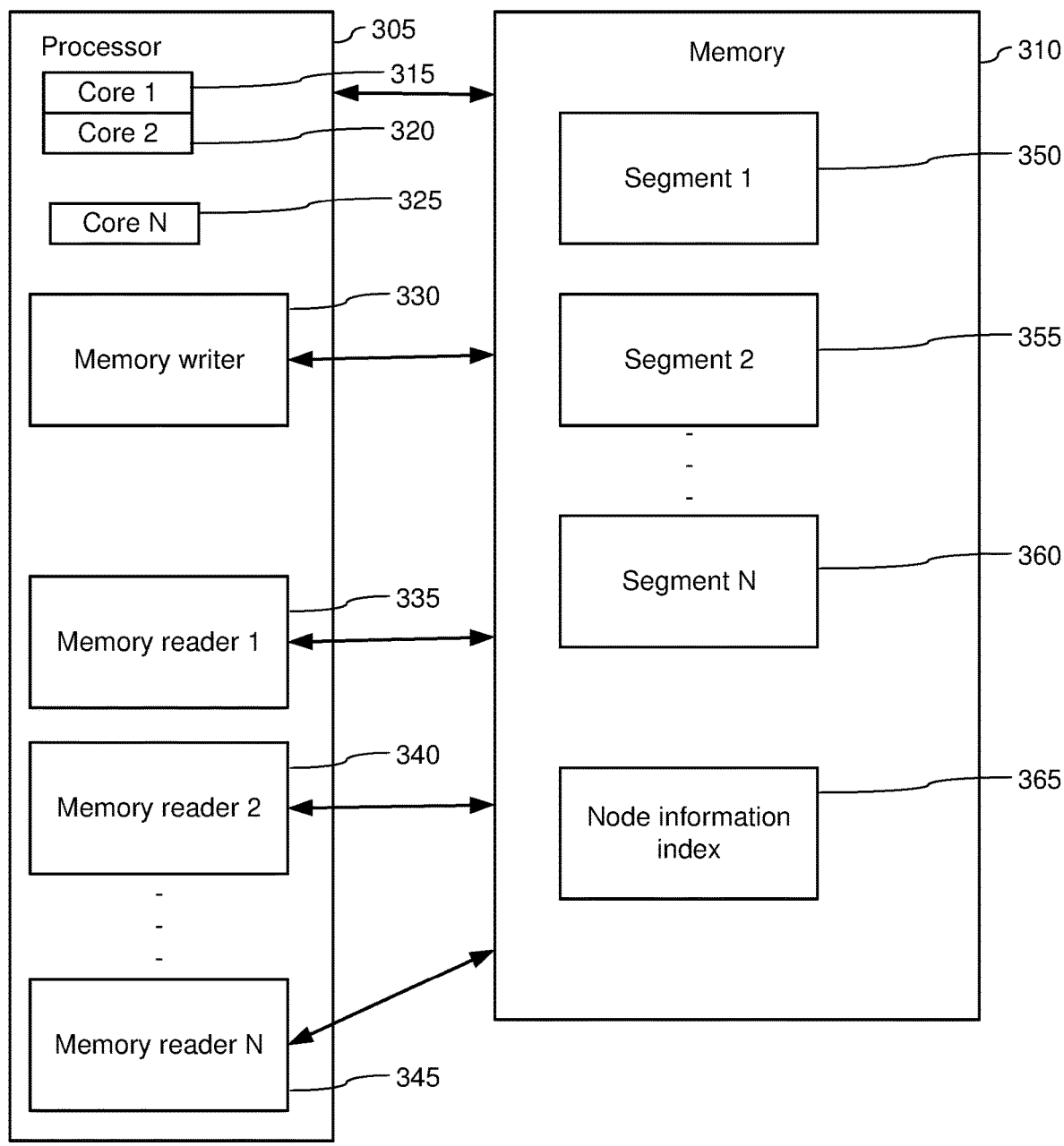
FIG. 3A depicts a block diagram showing a server device according to embodiments of the present invention.

FIG. 3A depicts a block diagram showing a server device 300 according to embodiments of the present invention that includes a block diagram of the data structure. FIG. 3A shows a processor 305 and a memory 310. Processor 305 includes at least one core. In the embodiment shown in FIG. 3A, there are N cores, core 1 315, core 2, 320, and core N 325. Processor 305 also includes memory writer 330, and N memory readers, memory reader 1 335, memory reader 2 340, memory reader N 345.

In an embodiment, there can be one memory writer 330 and a plurality of memory readers 335, 340, and 345. In some embodiments, there can be more than one memory writers and a plurality of memory readers. Typically, there will be more memory readers than writers. Each memory writer 330 writes edges to memory. Each memory reader 335, 340, and 345 reads from memory to perform the random walk. As shown in FIG. 3A, the memory 310 is divided into segments, segment 1 350, segment 2 355, segment N 360. Each segment 350, 355, and 360 represents a continuous sliding window of time. All the edges within the window of time can be stored within the segment. FIG. 3A also shows node information index 365 stored in memory 310. Node information index 365 is an index to the various segments 350, 355, and 360. Node information index 365 can be indexed user to content, content to user, user to query, or user to entity.

A segment is a continuous sliding window, which has all the edges within the time window. In an embodiment, the entire set of a plurality of segments as well as the node information index are stored on a single device in a data center. The node information index also can have a mapping from longs or any other number of bytes to ints (an integer value) or any other smaller number of bytes word to save storage space in the segments. In some embodiments, user information and content information or edges can be maintained in longs. However, storing longs in the segments would require more memory space than first converting to ints. The mapping of longs to ints can be done on a per segment basis or a per memory basis.

A plurality of memory writers 330 can be used in some embodiments by having a plurality of "live" segments representing the same window of time. The edges can be allocated randomly to each "live" segment. In some embodiments, there can also be a plurality of readers for each memory writer.

Figure 3B:
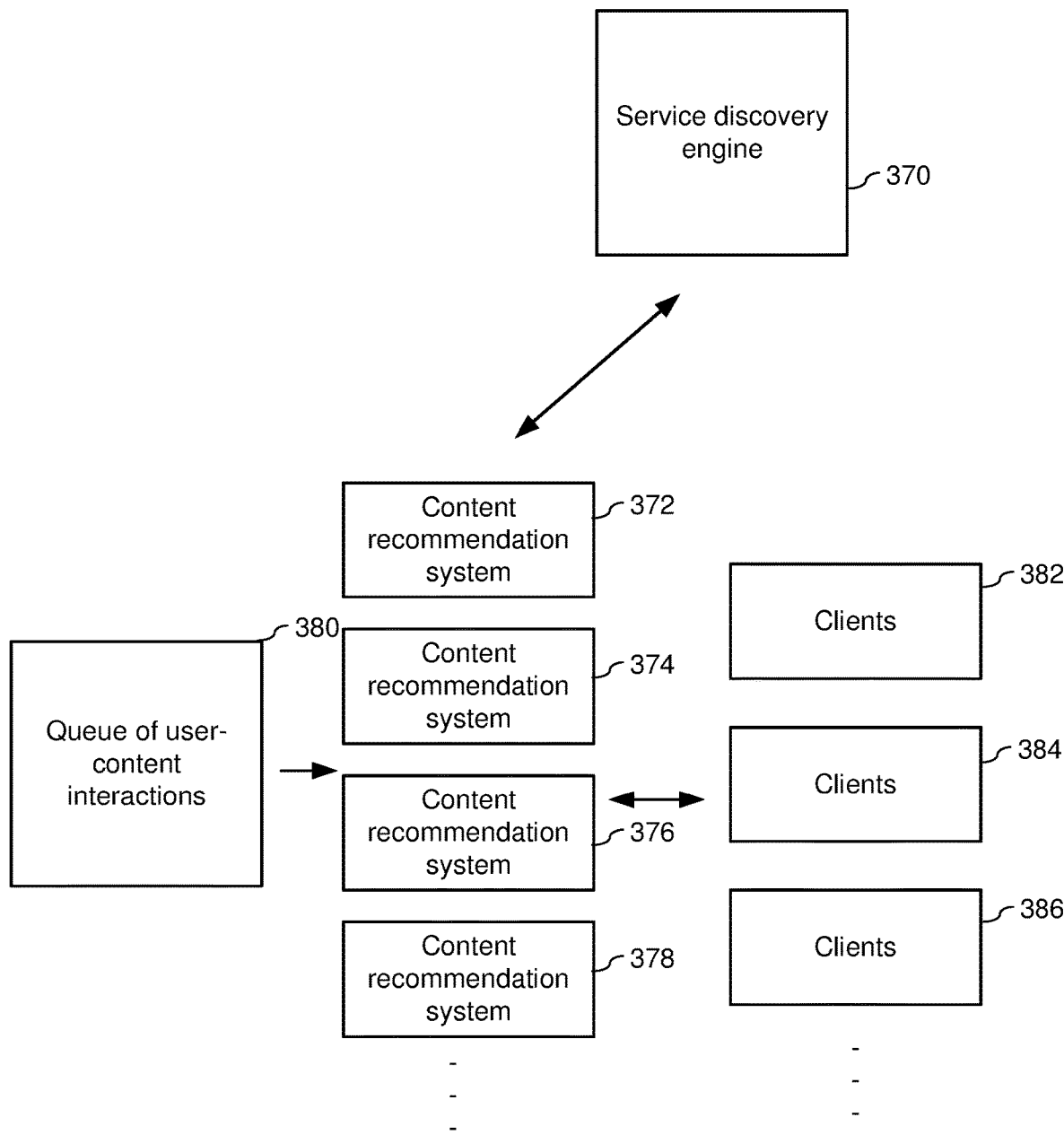
FIG. 3B depicts a block diagram showing a recommendation system according to embodiments of the present invention.

FIG. 3B depicts a block diagram showing a recommendation system according to embodiments of the present invention. FIG. 3B shows content recommendation system 372, 374, 376, and 378. Having a plurality of instances of content recommendation systems provides fault tolerance and can increase throughput. FIG. 3B also shows clients 382, 384, and 386. The queue of content interactions 380 provides the content input to the plurality of content recommendation systems 372, 374, 376, and 378. Service discovery engine 370 also provides input to the content recommendation systems 372, 374, 376, and 378 and receives input from the content recommendation systems 372, 374, 376, and 378.

In an embodiment, a single content recommendation system is able to support up to 500 recommendation requests per second, with a latency profile of p50=19 ms, p90=27 ms, and p99=33 ms at the load, representing the complete end-to-end latency for computing a recommendation. This latency includes fetching the relevant portions of the interaction graph to construct the bipartite sub-graph, as well as running the recommendation algorithm itself (i.e., multiple weight-distribution passes until convergence). Each individual recommendation request translates into many API calls to the underlying storage engine, which corresponds to several million edge lookup operations per second. The above numbers represent a lower bound on the raw performance of the underlying storage system, since the recommendation system can perform computations beyond edge lookups.

Figure 4:
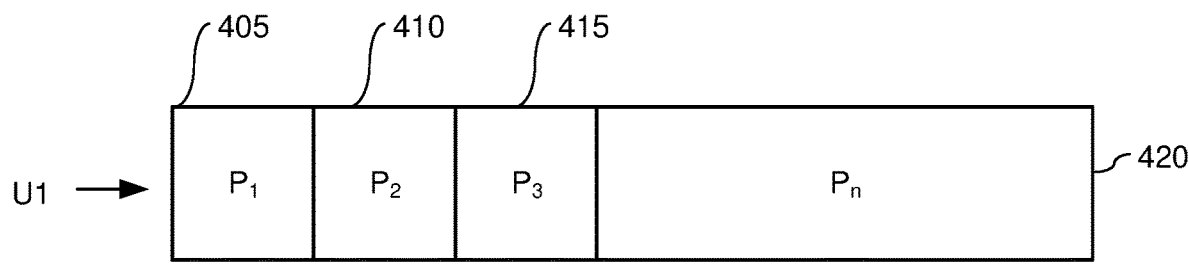
FIG. 4 depicts a block diagram of data structure according to embodiments of the present invention.
Figure 4:
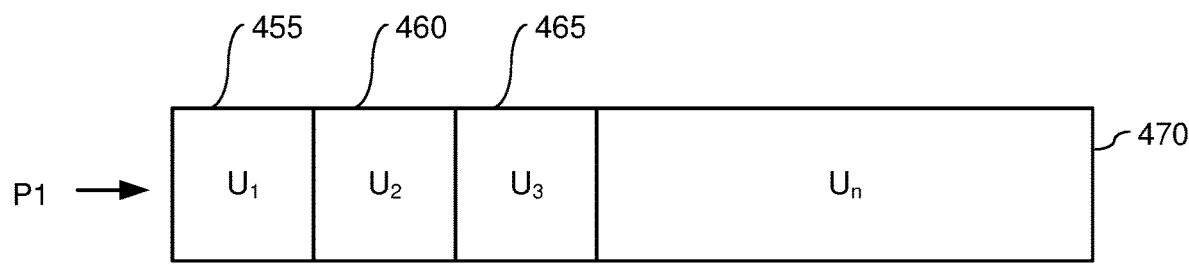

FIG. 4 depicts a block diagram of an adjacency list according to embodiments of the present invention. FIG. 4 shows a more detailed block diagram of two embodiments of segment 350, 355, or 360 shown in FIG. 3A. One embodiment 400 of FIG. 4 shows a relationship referred to herein as an adjacency list between user 1 and content shown as a posting list $P_1$ 405, $P_2$ 410, $P_3$ 415, and $P_n$ 420. Another embodiment 450 is shown in FIG. 4 showing an adjacency list between a posting list P1 and users $U_1$ 455, $U_2$ 460, $U_3$ 465, and $U_n$ 470. The data structures illustrate a mechanism to store edges between a single user and a plurality of content or posting lists in embodiment 400 and a mechanism to store edges between a single posting list and a plurality of users in embodiment 450. Posting list can be content, entity, or query.

In embodiments of the present invention, the adjacency list can have the following properties: edges can grow, reader can have unrestricted access, concurrent reader, ability to drop edges, and an algorithm to randomly sample edges in real-time. Since there can be tens of thousands of edges every second and there is no way to predict how many edges a given user or a given content (or posting list) will have, in embodiments of the present invention, the number of edges can grow. Furthermore, the number of edges can grow for each user or posting list.

The memory readers 335, 340, and 345 can also have unrestricted access. The memory writer 330 cannot lock the record since the recommendation happens in real-time and the number of edges written and read is so large in a relatively short amount of time. The memory readers 335, 340, and 345 can also operate concurrently reading from different memory segments 350, 355, and 360, concurrently. When memory writer 330 is done writing, memory writer 330 can mark the array such that the memory readers 335, 340, and 345 can go back and read what memory writer 330 has written. Memory writer 330 and memory readers 335, 340, and 345 can write to different portions of the memory array. Thus, allowing the writes and reads to take place simultaneously.

Also, the ability to drop edges can be important in some embodiments since memory space can quickly become an issue. In embodiments of the present invention, the present invention is intended to be a real-time operation and not intended to be a persistent data storage solution. Therefore, the edges can be stored for a limited time window for the purpose of recommendation. Thus, at the end of the time window, the edges can be dropped.

Embodiments of the present invention also include an algorithm for randomly sampling edges in real-time.

Figure 5:
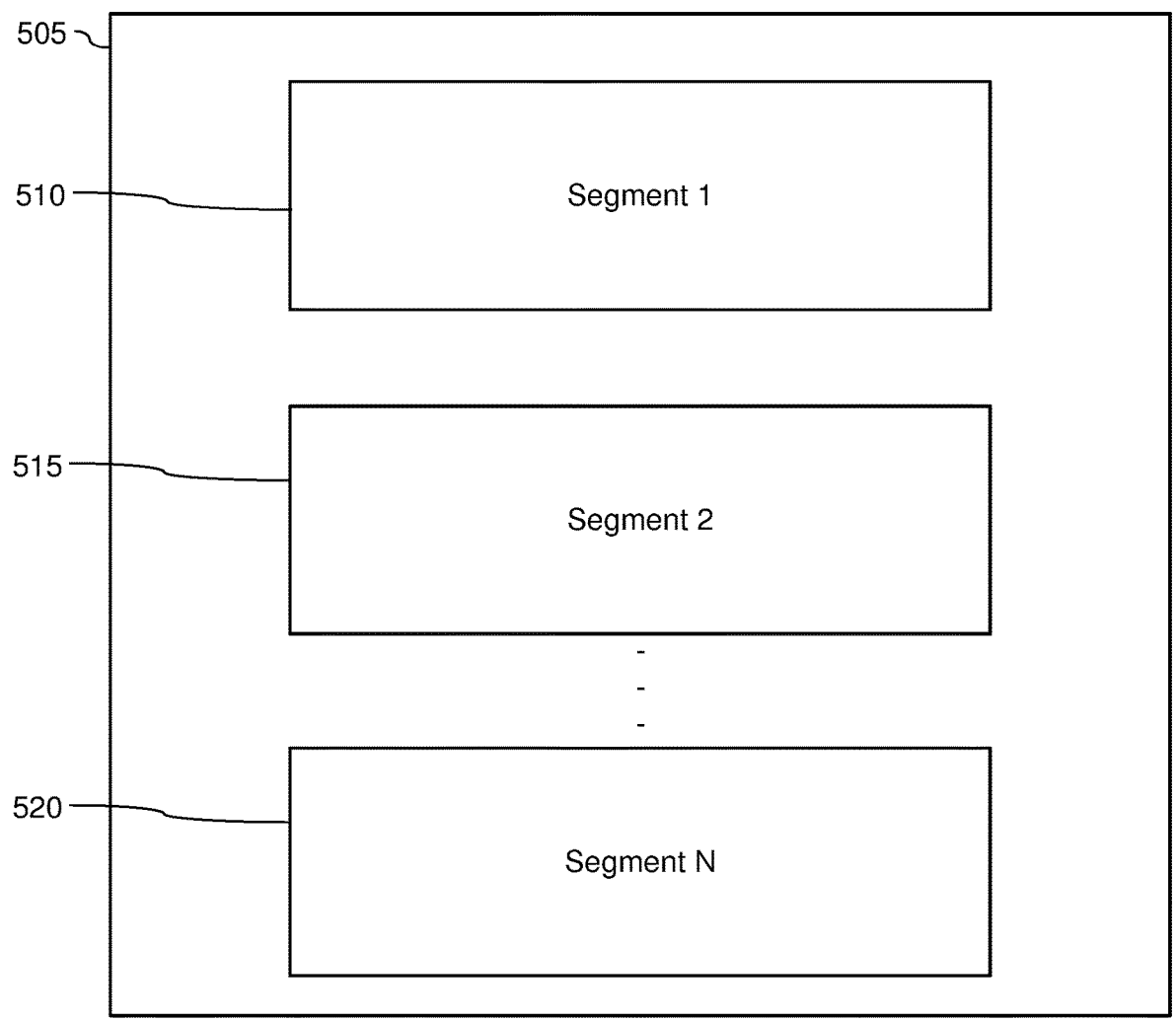
FIG. 5 depicts a block diagram of a memory according to embodiments of the present invention.

FIG. 5 depicts a block diagram 500 of a memory according to embodiments of the present invention. As one of ordinary skill in the art will appreciate, memory 505 shown in FIG. 5 can be implemented in random access memory (RAM) or any other non-volatile solid state memory.

Memory 505 includes a plurality of segments, segment 1 510, segment 2 515, segment N 520. Any number of segments can be used. However, in certain messaging platform applications eight segments can be used. Each segment can store the data structure shown in FIG. 4 to store the edges shown in FIG. 2 used to perform a random walk.

The memory writer 330 can write from the bottom and write to the latest segment. If a segment fills up, then the memory writer can go on to the next segment. In some embodiments of the present invention, the memory book keeping can be done by the operating system (OS). When segments are deleted, since they are large data structures, the garbage collection overhead is small.

Figure 6:
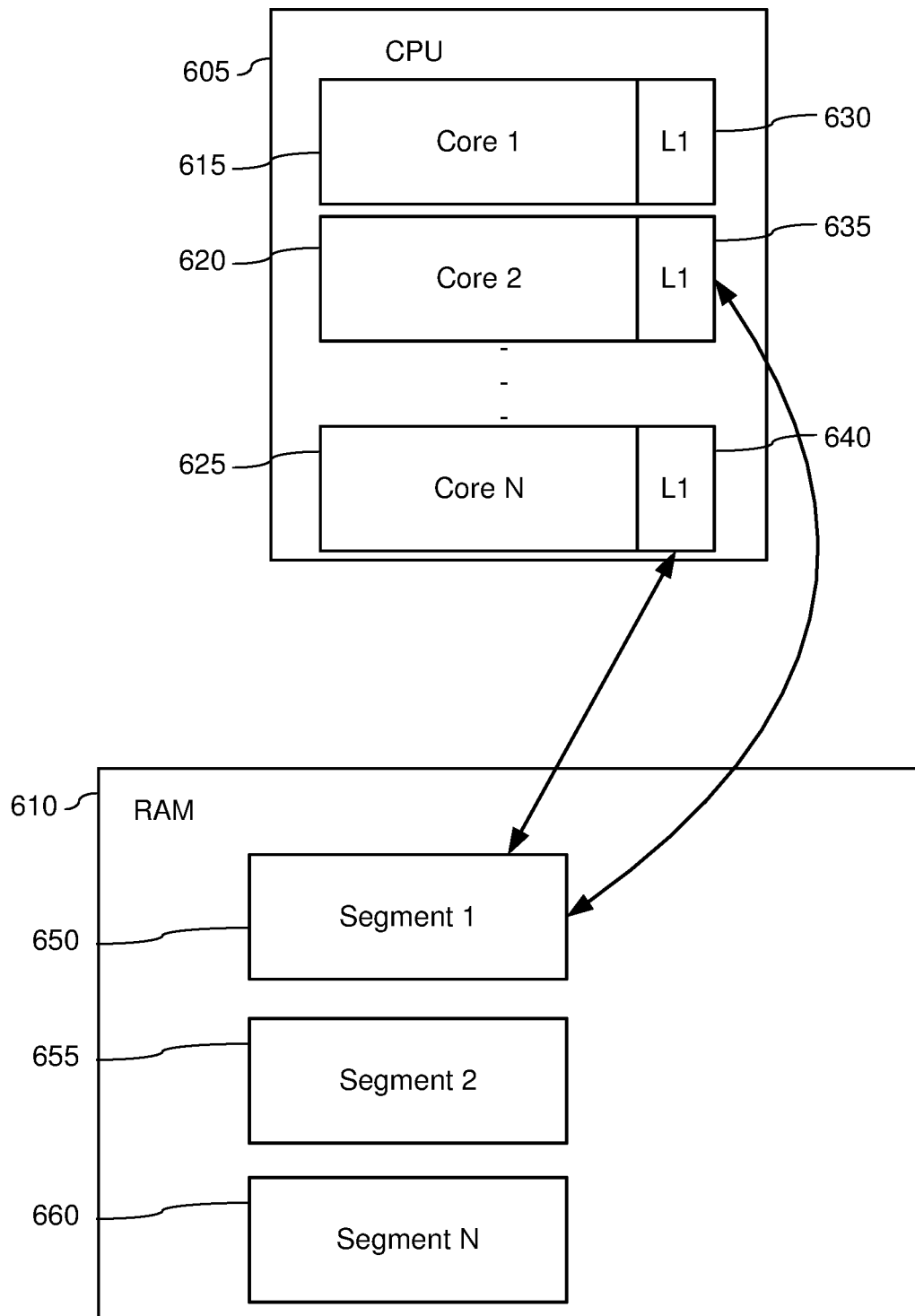
FIG. 6 depicts a block diagram of a server device according to embodiments of the present invention.

FIG. 6 depicts a block diagram of a server device 600 according to embodiments of the present invention. FIG. 6 shows a central processing unit (CPU) 605 and a random access memory (RAM) 610. In the embodiment shown, CPU 605 is a multi-core CPU including core 1 630 having level 1 (L1) cache 630, core 2 620 having L1 cache 635, and core N 625 having L1 cache 640. L1 caches 630, 635, and 640 are small memories (or caches) that store copies of data from frequently used memory locations. However, the L1 cache can be behind when keeping up with the large number of edge updates in a short amount of time.

Embodiments shown in FIG. 6 also show RAM 610 including segment 1 650, segment 2 655, and segment N 660. These segments store the adjacency list shown in FIG. 4. One of ordinary skill in the art will appreciate that the size of RAM 610 can be adjusted to increase or decrease the amount of storage space and therefore increase or decrease the size of the time window used. For example, a window of 10 hours can be used for very short term interest, a window of 17 hours can be used for medium term interest or a window of 36 hours can be used for longer term interest. With each increase in time window, there would be a corresponding increase in RAM size. For example, with a 17 hour window, there can be approximately 1.2 billion edges, depending on the size and number of users of the messaging platform. One of ordinary skill in the art will also appreciate that any time window size that is desirable can be used.

In an embodiment, CPU 605 can use a lock-free model on writes. Therefore, the memory writer in the CPU 605 can write to segments 650, 655, or 660 in RAM 610 without locking the memory. Edges can be inserted in a way that memory readers can access edges that have already been written.

In an embodiment, a lazy fetch can be used. In a lazy fetch, the memory writer does not push the latest information to the memory reader, the member reader can read the information the memory reader is interested in obtaining when it is interested in it. Thus, overcoming timing issues with using L1 cache 630, 635 or 640.

Embodiments use an operating system (OS) to allocate the memory readers and writers to the CPU cores. For example, in one embodiment, a single memory writer is used and is allocated to a single CPU core such as core 1 615. Some embodiments use a plurality of memory readers, allocated by the OS to a plurality of CPU cores, for example to core 2 635 to core N 640. From the memory reader point of view the graph allows access to every segment. However, in some embodiments of the present invention for the memory writer only one segment is "live." In other embodiments, there can be more than one "live" segment representing the same window of time and allocating edges to each "live" segment randomly.

Figure 7:
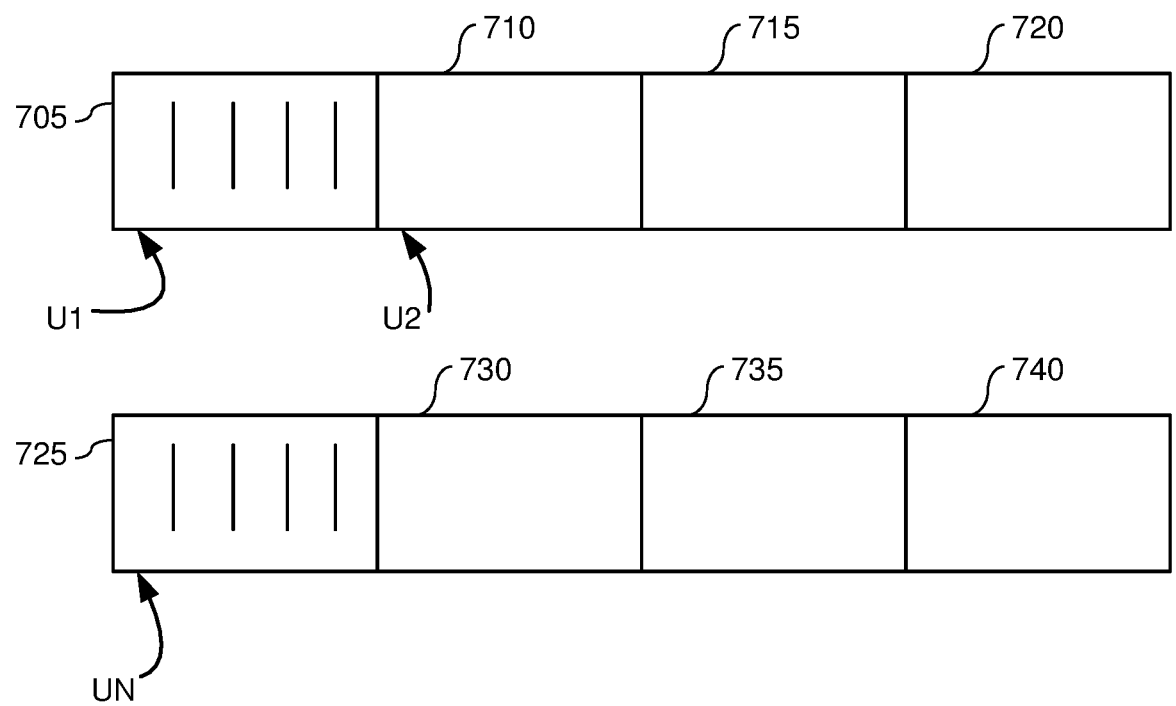
FIG. 7 depicts a block diagram of a data structure according to embodiments of the present invention.

FIG. 7 depicts a block diagram of a data structure according to embodiments of the present invention. FIG. 7 illustrates a regular graph. In a regular graph, each user has a degree less than or equal to a predetermined, fixed number. In other words, each user is limited to a fixed number of edges that can be stored. FIG. 7 illustrates memory segment 700 where user 1 has a certain number of memory spaces for storing edges. In FIG. 7, user 1 uses memory space 705 and can store 5 edges and user 2 uses memory space 710 and can store 5 edges, etc. This regular graph is not ideal for storing real-time edges since the number users and the number of edges that can be stored are fixed. Also, not all users will use all the memory allocated to them so that graph is wasteful of memory. Furthermore, some users will go above the allocated number of edges. When segment 700 becomes full, that segment can be frozen and another segment started with the same constraints.

Figure 8:
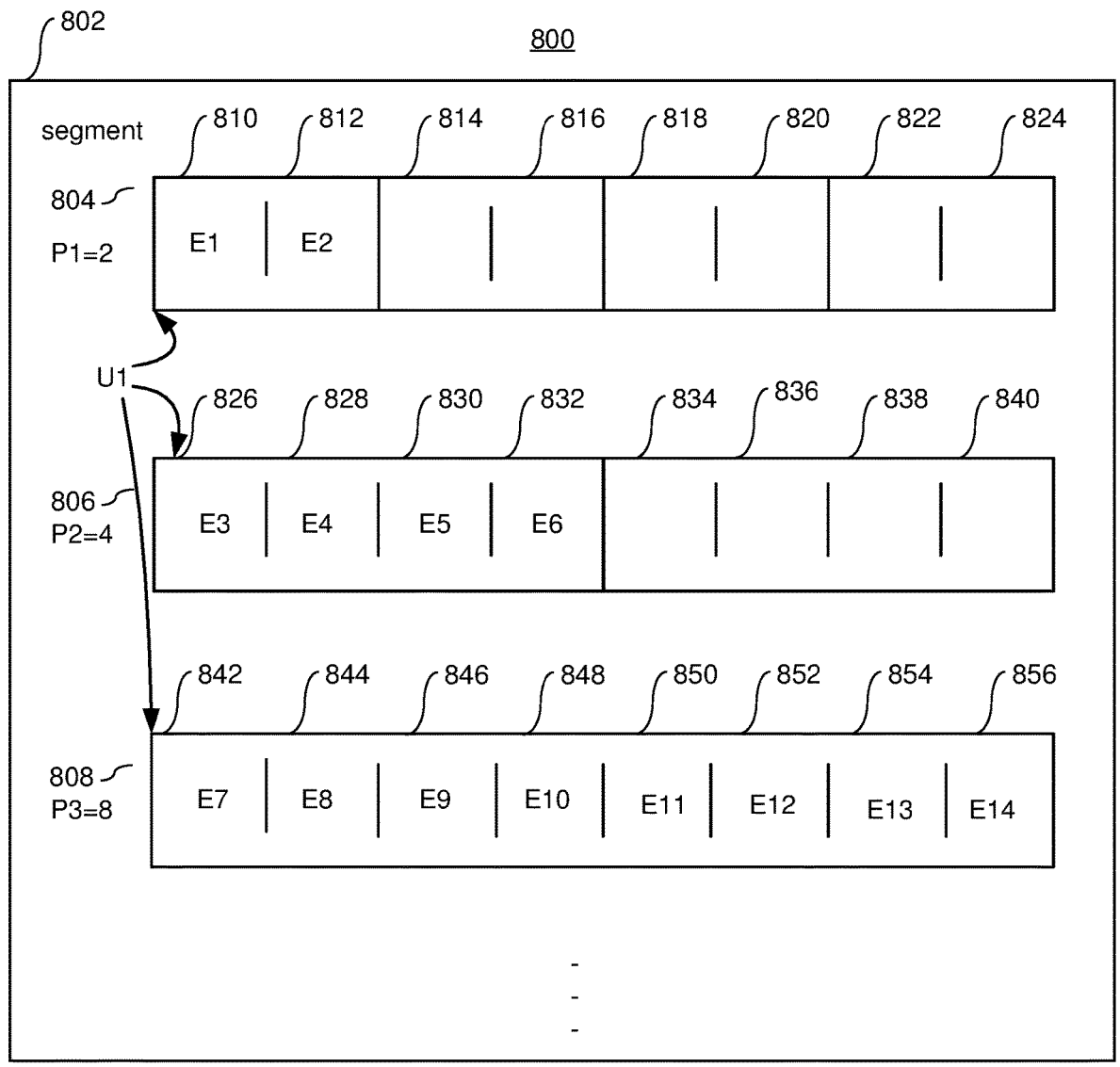
FIG. 8 depicts a block diagram of a data structure segment according to embodiments of the present invention.

An alternative graph that can be used is shown in FIG. 8. FIG. 8 depicts a block diagram of a data structure segment 800 according to embodiments of the present invention. FIG. 8 illustrates a power law graph. A power law graph follows a power law distribution. A power law distribution takes advantage of the fact that a very small number of users will have a high degree. One of ordinary skill in the art will appreciate that a high degree refers to the number of edges stored, where each edge represents a degree. Embodiments of the present invention use a power law graph to trade off the degree and the number of users who have that degree. Only a very small number of users will have a high degree (or store a large number of edges). A high number of users will store a small number of edges.

The power law graph maintains a plurality of pools as shown in FIG. 8. FIG. 8 shows one segment 802 with a plurality of pools including pool 1 (P1) 804 with a degree 2, pool 2 (P2) 806 with degree 4, pool 3 (P3) 808 with degree 8. One of ordinary skill in the art will appreciate that for the sake of ease of explanation only three pools have been shown, but any number of pools can be used.

The power law graph shown in FIG. 8 can support N users of degree 2 and can allocate memory space to store up to two edges for each of N users in pool 1 804. Again, for ease of explanation, P1 804 is shown for 4 users with space to store edges referred to as shards 810, 812, 814, 816, 818, 820, 822, and 824. A shard is an array component of a pool. A pool is a set of shards for a single segment. Half of the users have degree 4, one quarter of the users have degree 8, etc. Each of the pools becomes similar to a regular graph.

The pools are populated first in P1 804. So if a user has only two edges to store, then the edges are stored only in P1 804. However, for example, user 1 has three edges to store. Then the first two edges can be stored in shards 810 and 812 and the third edge can be stored in P2 806 in shard 826. The fourth edge would be stored in shard 828, etc. A pointer is also added for U1 to P2 806.

As another example, if user 1 has 10 edges to store the first two edges would be stored in pool 1 804 in shards 810 and 812, the next four edges would be stored on pool 2 806 in this example in shards 826, 828, 830, and 832, the next eight edges would be stored in pool 3 808 in this example in shards 842, 844, 846, 848, 850, 852, 854, and 856. So for the example of storing 10 edges, the edges would be stored in shards 810, 812, 826, 828, 830, 832, 842, 846, and 848. However, if another user had stored its third edge before user 1 stored its third edge, then user 1's third edge would be stored in shard 834 in pool 2 806 and its pointer in the node index would be adjusted accordingly.

Node information index 365 in FIG. 3A includes a reference to the starting point of each shard for an edge and the number of occurrences of each edge in the pool.

In embodiments of the present invention, the power law graph permits fast random sampling that can be used to provide recommendations. One example of random sampling is assuming the degree of the user is 12 or there are 12 edges stored for a particular user, then random sampling involves selecting a random number between 0 and 12. For the purpose of this explanation, assume the random number selected is 7. For random sampling, the server can access that degree number very quickly. The degree of U is less than or equal to the number of pools you need to go to. For example, $$\text{Degree}(U) \leq 2^1 + 2^2 + 2^3$$

$$= 2^4 - 1$$

Taking the log of number gives the pool and the offset. For example, using the example of degree 7, taking the log of 7 yields that it is stored in pool 3, offset 1.

A log calculation can be performed by the CPU or a lookup table stored in memory can be used. Using this graph for random sampling the random sampling occurs in O(1) time.

In some embodiments, the random sampling performed uses a Walker-Alias algorithm if the user edges are stored on a plurality of segments. For example, if a user can have 4 edges stored on segment 1, 15 edges stored on segment 2, and 31 edges stored on segment 7. To use the Walker-Alias method, each of the edges should be considered, or effectively lined up and weighted. The Walker-Alias algorithm builds two tables, a probability table and an alias table. To generate a random outcome, an index into the probability table is determined. Random sampling across a plurality of segments still results in a random sample in O(1) time.

In an embodiment the alias method is used, which uses O(n) preprocessing time, after which values can be drawn in O(1) time. The alias method requires the construction of two tables, a probability table and an alias table, which is performed at the time when the API is called to capture the degree distribution across the segments at that time. The two generated tables are encapsulated in the iterator, along with other state information to ensure that edges added after the API call are not visible. To sample each edge, the iterator first uses the alias method to determine the index segment to sample from, and then draws a uniform random sample from edges in that index segment.

Figure 9:
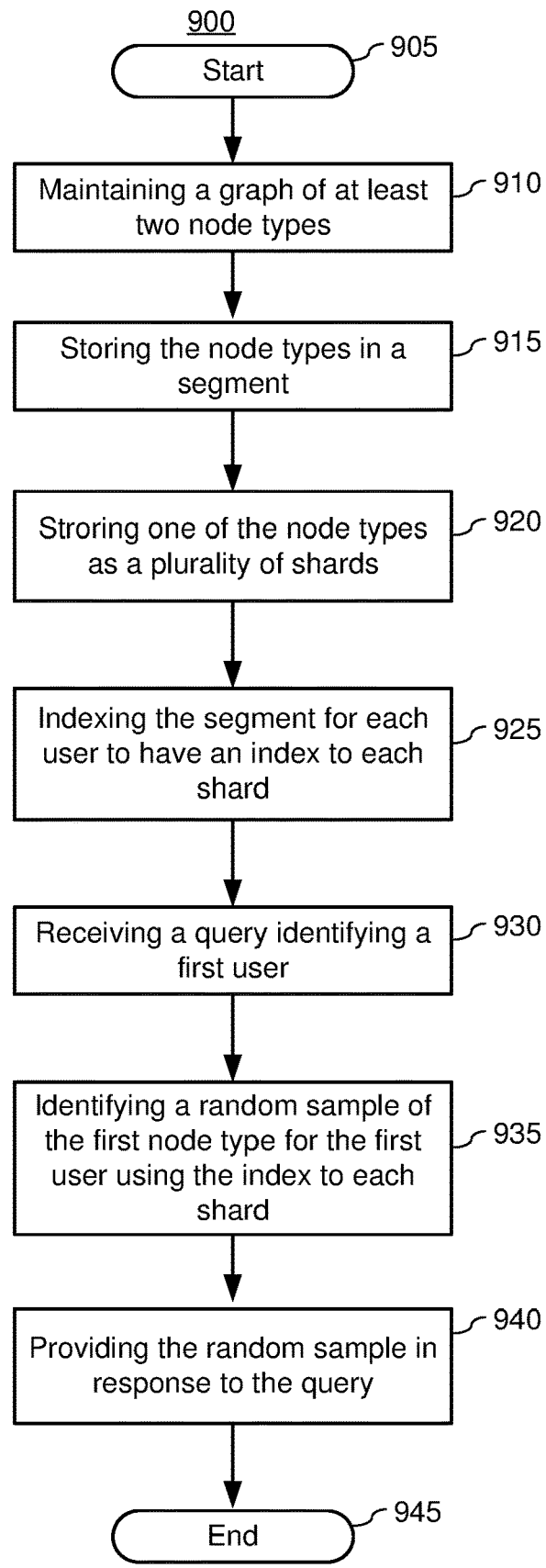
FIG. 9 depicts a flowchart of a method for proving recommendations according to embodiments of the present invention.

FIG. 9 depicts a flowchart of a method 900 for proving recommendations according to embodiments of the present invention. FIG. 9 illustrates starting the flow 905, maintaining a graph of at least two node types 910, storing the node types in a segment 915, storing one of the node types a plurality of shards 920, indexing the segment for each user to have an index to each shard 925, receiving a query identifying a first user 930, identifying a random sample of the first node type for the first user using the index to each shard 935, providing the random sample in response to the query 940, and ending the flow 945.

The flow shown in FIG. 9 can be implemented on a server device 300 depicted in FIG. 3A. In some embodiments, the segments can be stored in memory, such as RAM or other non-volatile memory.

In one implementation, a social media platform uses a data engine to support a recommendation engine. The data engine stores the underlying data used to make recommendations by the recommendation engine. The recommendations can be related to nodes of the social media platform.

In this implementation, nodes are users and social media messages or social media posts. Edges are engagements between the users and the social media messages. In this implementation, the edges are stored as a directed graph in segments where each segment comprises a plurality of pools and each pool a plurality of arrays known as shards.

In this implementation, the nodes are managed at a segment level rather than a pool level. The edges related to a particular node may be stored across a plurality of pools with pointers indicating in which pool to find the next edge. This implementation is different from past implementations using a continuous storage of edges with pointers from a most recent pool, which points to the next most recent pool and so forth until the oldest pool in the segment.

In this implementation, the segments store edges related to a shifting temporal window, e.g., 20 hours. In this implementation, the recommendations can be related to users, e.g., what users to track or follow on the social media platform, or can be related to the social media messages on the social media platform, e.g., what social media messages or posts to send to a user.

In this implementation, a power law graph can be used to take advantage of the assumption that relatively few nodes have high number of edges and that high number of nodes have a small number of edges. Memory allocation is performed as described herein whether the power law assumption is completely accurate. However, if the data follows the power law, then memory consumption is more efficient than if the data does not entirely follow the power law. Using a power law graph also has the benefit of efficiently performing fast random sampling.

In this implementation, a lock-free memory writer is used. The lock-free memory writer does not lock the memory for writing. Rather it marks the recently written memory so that the memory reader can read it upon completion of writing.

One advantage of storing the edges as a power law graph managed at the segment level is that fast random sampling can be accomplished as result of using the power law graph.

One advantage of the present invention is that real-time recommendations can be provided even on large messaging platforms.

Another advantage of the present invention is that real-time recommendations can be provided based on random sampling of stored associates between two node types.

One of ordinary skill in the art will appreciate that various benefits are available as a result of the present invention.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

In the above description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules and are implemented in the disclosed hardware components.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to provide recommendations to users in a messaging platform.

It shall also be noted that although embodiments described herein may be within the context of content recommendations and server structure, the invention elements of the current patent document are not so limited. Accordingly, the invention elements may be applied or adapted for use in other contexts.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

The invention claimed is:

1. A server device, comprising:
   at least one computer processor comprising one or more processor cores;
   a memory storing:
      a plurality of segments, wherein each segment of the plurality of segments comprises a corresponding postings list of at least a first content type for users of a messaging platform, wherein each corresponding postings list for each segment of the plurality of segments corresponds to content occurring in the messaging platform during a particular time period, and wherein each corresponding postings list for each segment of the plurality of segments comprises a plurality of shards; and
      a node information index comprising an indication of, for each user, an index to each shard of the corresponding postings list for each of the plurality of segments;
   a search module executing on the computer processor to enable the computer processor to:
      receive a query identifying a first user of the users of the messaging platform;
      identify, from one or more postings lists, a random sample of the first content type for the first user, wherein identifying the random sample comprises using a corresponding index to each shard of the one or more of the postings lists to randomly sample the first content type; and
      provide the random sample in response to the query; and
   a recommendation engine executing on the at least one computer processor to enable the at least one computer processor to:
      use the provided random sample of the first content type to provide a recommendation to the first user.

2. The server device of claim 1 wherein the at least one computer processor further comprises:
   a memory writer executing on a first processor core; and
   a plurality of memory readers executing on a plurality of processor cores.

3. The server device of claim 1 wherein the at least one computer processor further comprises a plurality of memory writers, each memory writer associated with a segment representing a time period, wherein a plurality of segments represent the same time period.

4. The server device of claim 1 wherein the at least one computer processor implements random sampling using a plurality of two-step random walks originating from a group of second users of the messaging platform identified in the node information index.

5. The server device of claim 1 wherein the random sampling occurs in O(1) time.

6. The server device of claim 1 wherein the recommendation engine executing on the at least one computer processor further enables the at least one computer processor to:
   send the query identifying the first user of the users of the messaging platform to the search module; and
   receive the random sample of the first content type for the first user.

7. The server device of claim 1 further comprising a frontend module executing on the at least one computer processor to enable to the at least one computer processor to:
   receive a request for a recommendation; and
   request a recommendation from the messaging platform.

8. A method for providing recommendations in a messaging platform, comprising:
   maintaining a graph associating user information and content information on the messaging platform;
   storing the user information and the content information in a plurality of segments, wherein each segment of the plurality of segments comprises a partition of the graph of user information and content information occurring on the messaging platform during a particular time period and wherein corresponding content information and corresponding user information of each segment comprises a plurality of shards, each shard having different storage properties;
   indexing each segment of the plurality of segments according to each user in user information stored in the segment being indexed such that an index to each shard associated with content information stored in the segment being indexed is created;
   receiving a query identifying a first user of the messaging platform;
   identifying a random sample of particular content information for the identified first user, wherein identifying the random sample comprises using corresponding indexes to corresponding shards to randomly sample the particular content information for the identified first user of the messaging platform;
   providing the random sample in response to the query; and
   using the provided random sample to provide a recommendation to the first user.

9. The method of claim 8 further comprising:
   sending a query identifying the first user of the users of the messaging platform; and
   receiving the random sample of the first content information for the first user.

10. The method of claim 8 wherein the random sampling occurs in O(1) time.

11. The method of claim 8 further comprising writing to a segment representing a time period, wherein a plurality of segments represent the same time period.

12. The method of claim 8 further comprising:
   receiving a request for a recommendation; and
   requesting a recommendation from the messaging platform.

13. The method of claim 8 further comprising implementing random sampling using a plurality of two-step random walks originating from a group of second users of the messaging platform identified in the index.

14. The method of claim 8 further comprising:
   executing a memory writer on a first processor core; and
   executing a plurality of memory readers on a plurality of processor cores.

15. The method of claim 8, wherein the recommendation comprises one or more of recommended message content or recommended users of the messaging platform.

16. A non-transitory computer readable medium or media comprising one or more sequences of instructions which, when executed by one or more processors, causes steps for directing traffic in a data communication system comprising:
   maintaining a graph associating user information and content information on a messaging platform;
   storing the user information and the content information in a plurality of segments, wherein each segment of the plurality of segments comprises a partition of the graph of user information and content information occurring on the messaging platform during a particular time period and wherein corresponding content information and corresponding user information of each segment comprises a plurality of shards, each shard having different storage properties;
   indexing each segment of the plurality of segments according to each user in user information stored in the segment being indexed such that an index to each shard associated with content information stored in the segment being indexed is created;
   receiving a query identifying a first user of the messaging platform;
   identifying a random sample of particular content information for the identified first user, wherein identifying the random sample comprises using corresponding indexes to corresponding shards to randomly sample the particular content information for the identified first user of the messaging platform;
   providing the random sample in response to the query; and
   using the provided random sample to provide a recommendation to the first user.

17. The computer readable medium of claim 16 wherein the random sampling occurs in O(1) time.

18. The computer readable medium of claim 16 further comprising instructions for:
   receiving a request for a recommendation; and
   requesting a recommendation from the messaging platform.

19. The computer readable medium of claim 16, further comprising instruction for implementing random sampling using a plurality of two-step random walks originating from a group of second users of the messaging platform identified in the index.

20. The computer readable medium of claim 16, wherein the recommendation comprises one or more of recommended message content or recommended users of the messaging platform.

* * * * *